(12) United States Patent
Horvitz et al.

(10) Patent No.: US 6,499,025 B1
(45) Date of Patent: Dec. 24, 2002

(54) SYSTEM AND METHOD FOR TRACKING OBJECTS BY FUSING RESULTS OF MULTIPLE SENSING MODALITIES

(75) Inventors: Eric J. Horvitz, Kirkland; Kentaro Toyama, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/323,724

(22) Filed: Jun. 1, 1999

(51) Int. Cl.⁷ .............................................. G06F 9/445
(52) U.S. Cl. .............................. 706/52; 342/64; 700/90
(58) Field of Search .............................. 706/25, 51, 52; 250/332; 342/64; 700/90

(56) References Cited

U.S. PATENT DOCUMENTS

| | | | | |
|---|---|---|---|---|
| 4,939,369 A | * | 7/1990 | Elabd | 250/332 |
| 5,280,565 A | * | 1/1994 | Nomoto et al. | 706/52 |
| 5,289,563 A | * | 2/1994 | Nomoto et al. | 706/52 |
| 5,307,289 A | * | 4/1994 | Harris | 700/90 |
| 5,341,142 A | * | 8/1994 | Reis et al. | 342/64 |
| 5,572,628 A | * | 11/1996 | Denker et al. | 706/25 |
| 5,598,512 A | * | 1/1997 | Niwa | 706/52 |
| 5,673,365 A | * | 9/1997 | Basehore et al. | 706/46 |
| 5,687,291 A | * | 11/1997 | Smyth | 706/10 |
| 5,751,915 A | * | 5/1998 | Werbos | 706/4 |
| 5,809,493 A | * | 9/1998 | Ahamed et al. | 706/52 |

OTHER PUBLICATIONS

Visual interaction with lifelike characters, Turk, M.; Automatic Face and Gesture Recognition, 1996., Proceedings of the Second International Conference on, 1996, pp. 368–373.*

VITS—a vision system for autonomous land vehicle navigation, Turk, M.A.; Morgenthaler, D.G.; Gremban, K.D.; Marra, M. Pattern Analysis and Machine Intelligence, IEEE Transactions on, vol. 10 Issue: 3, May 1988, pp. 342–361.*

Face recognition using eigenfaces, Turk, M.A.; Pentland, A.P.; Computer Vision and Pattern Recognition, 1991, Proceedings CVPR '91., IEEE Computer Society Conference on, 1991, pp. 586–591.*

View–based interpretation of real–time optical flow for gesture recognition, Cutler, R.; Turk, M.; Automatic Face and Gesture Recognition, 1998, Proceedings. Third IEEE International Conference on, 1998, pp. 416–421.*

Tracking self–occluding articulated objects in dense disparity maps, Jojic, N.; Turk, M.; Huang, T.S.; Computer Vision, 1999. The Proceedings of the Seventh IEEE International Conference on, vol. 1, 1999, pp. 123–130 vol. 1.*

(List continued on next page.)

*Primary Examiner*—Thomas Black
*Assistant Examiner*—Michael B. Holmes
(74) *Attorney, Agent, or Firm*—Lyon & Harr, LLP; Mark A. Watson

(57) ABSTRACT

The present invention is embodied in a system and method for efficiently and efficiently performing automated vision tracking, such as tracking human head movement and facial movement. The system and method of the present invention fuses results of multiple sensing modalities to achieve robust digital vision tracking The system and method effectively fuses together the results of multiple vision processing modalities for performing tracking tasks in order to achieve robust vision tracking. The approach integrates reports from several distinct vision processing procedures in a probabilistically coherent manner by performing inferences about the location and/or motion of objects that considers both the individual reports about targets provided by visual processing modalities, as well as inferences about the context-sensitive accuracies of the reports. The context-sensitive accuracies are inferred by observing evidence with relevance to the reliabilities of the different methods.

40 Claims, 7 Drawing Sheets

OTHER PUBLICATIONS

Pfinder: real-time tracking of the human body, Wren, C.; Azarbayejani, A.; Darrell, T.; Pentland, A.; Automatic Face and Gesture Recognition, 1996., Proceedings of the Second International Conference on, 1996, pp. 51–56.*

Pfinder: real-time tracking of the human body, Wren, C.R.; Azarbayejani, A.; Darrell, T.; Pentland, A.P.; Pattern Analysis and Machine Intelligence, IEEE Transactions on, vol. 19 Issue: 7, Jul. 1997, pp. 780–785.*

Dynamic models of human motion, Wren, C.R.; Pentland, A.P.; Automatic Face and Gesture Recognition, 1998. Proceedings Third IEEE International Conference on, 1998, pp. 22–27.*

Understanding purposeful human motion, Wren, C.R.; Pentland, A.P.; Modelling People, 1999. Proceedings. IEEE International Workshop on, 1999 pp. 19–25.*

Intelligent wheelchair using visual information on human faces, Adachi, Y.; Kuno, Y.; Shimada, N.; Shirai, Y.; Intelligent Robots and Systems, 1998. Proceedings., 1998 IEEE/RSJ International Conference on, vol. 1, 1998, pp. 354–359, vol. 1.*

Robust Visual Tracking by Integrating Various Cues, Yoshiaki Shirai, Member, Tsuyoshi Yamane, and Ryuzo Okada, non–member, IEICE Trans. Inf. & Syst. vol. E81–D, No. 9, Sep. 1998.*

Multimodal estimation of discontinuous optical flow using Markow random fields, Heitz, F.; Bouthemy, P.; Pattern Analysis and Machine Intelligence, IEEE Transactions on, vol. 15 Issue: 12, Dec. 1993 pp. 1217–1232.*

Parallel visual motion analysis using multiscale Markov random fields, Heitz, F.; Perez, P.; Bouthemy, P.; Visual Motion, 1991., Proceedings of the IEEE Workshop on, 1991, pp. 30–35.*

Motion estimation and segmentation using a global Bayesian approach, Heitz, F.; Bouthemy, P.; Acoustics, Speech, and Signal Processing, 1990. ICASSP–90., 1990 International Conference on, 1990 pp. 2305–2308 vol. 4.*

A model–based gaze tracking system, Stiefelhagen, R.; Jie Yang; Waibel, A.; Intelligence and Systems, 1996., IEEE International Joint Symposia on, 1996, pp. 304–310.*

Gaze tracking for multimodal human—computer interaction, Stiefelhagen, R.; Yang, J.; Acoustics, Speech, and Signal Processing, 1997. ICASSP–97., 1997 IEEE International Conference on, vol. 4, 1997, pp. 2617–2620 vol. 4.*

Modeling people's focus of attention, Stiefelhagen, R.; Jie Yang; Waibel, A.; Modelling People, 1999. Proceedings. IEEE International Workshop on, 1999, pp. 79–86.*

Visual Tracking for Multimodal Human Computer Interaction, Jie Yang; Rainer Stielelhagen; Uwe Meier; Alex Waibel, CHI 1998.*

Simon Haykin, McMaster University, Hamilton, Ontario, Canada, "Neural Networks, A Comprehensive Foundation," Chapter 6 & Chapter 7, IEEE Computer Society Press, IEEE Press®, Copyright © 1994 by MacMillan College Publishing Company, Inc.*

Baysian Modality Fusion: Probabilistic Integration of Multiple Vision Algorithms for Head Tracking, Kentaro Toyama, Eric Horwitz, Microsoft Research.*

Mobile Robots X, Editors, Chase H. Kenyon, MicorAlternatives, Bradford NH, USA; William J. Wolfe, University of Colorado/Denver, Little, CO USA.*

A Survey of Tracking Technology for Virtual Environments, Jannick P. Rolland, Yohan Baillot, and Alexei A. Goon, Center for Research and Education in Optics and Lasers (CREOL) University of Central Florida, Orlando Florida.*

A Survey of Tracking Technology for Virtual Environments, Jannick, P. Rolland, Yohan Baillot, and Alexei A. Goon, Center for Research and Education in Optics and Lasers (CREOL) University of Central Florida, Orlando Florida (2000).*

Co–pending U.S. application No. 09/175,182, "A System and Method for Automatically Detecting Pixel Clusters Within an Image," filed Oct. 28, 1998.

Turk, M. "Visual Interaction with Lifelike Characters". In automatic Face and Gesture Recognition, 1996.

Wren, C.R., A. Asarbayejani, T. Darrell and A. Pentland, "Pfinder: Real–Time Tracking of the Human Body," In Vismod, 1995.

Shirai, Y., Yamane, T., and Okada, R., "Robust Visual Tracking by Integrating Various Cues," IEICE Trans. Inf. & Syst., vol. E81–D, No. 9 Sep. 1998, pp. 951–958.

Heitz, F., and Bouthemy, P., "Multimodal Estimation of Discontinuous Optical Flow Using Markov Random Fields," 8180 IEEE Transactions on Pattern Analysis and Machine Intelligence 15 Dec. (1993), No. 12, New York, US, pp. 1217–1232.

Yang, J., Stiefelhagen, R., Meier, U., and Waibel, A., Visual Tracking for Multimodal Human Computer Interaction, CHI 98, Apr. 18–23, 1998, Los Angeles, CA, USA, pp. 140–147.

* cited by examiner

SYSTEM AND METHOD FOR TRACKING OBJECTS BY FUSING RESULTS OF MULTIPLE SENSING MODALITIES

BACKGROUND OF THE INVENTION

1. Field of the Invention

The present invention relates to a system and method for tracking objects, and in particular, to a system and method for fusing results of multiple sensing modalities for efficiently performing automated vision tracking, such as tracking human head movement and facial movement.

2. Related Art

Applications of real-time vision-based object detection and tracking is becoming increasingly important for providing new classes of services to users based on an assessment of the presence, position, and trajectory of objects. Research on computer-based motion analysis of digital video scenes centers on the goal of detecting and tracking objects of interest, typically via the analysis of the content of a sequence of images. Plural objects define each image and are typically nebulous collections of pixels, which satisfy some property. Each object can occupy a region or regions within each image and can change their relative locations throughout subsequent images and the video scene. These objects are considered moving objects, which form motion within a video scene.

Facial objects of a human head, such as mouth, eyes, nose, etc., can be types of moving objects within a video scene. It is very desirable to automatically track movement of these facial objects because successful digital motion analysis of facial movement has numerous applications in real world environments. For example, one application includes facial expression analysis for automatically converting facial expressions into computer readable input for performing computer operations and for making decisions based on human emotions derived from the facial expressions. Another application is for digital speech recognition and "lip reading" for automatically recognizing human speech without requiring human vocal input or for receiving the speech as computer instructions. Another application is the visual identification of the nature of the ongoing activity of one or more individuals so as to provide context-sensitive assistance and communications.

However, current real-time tracking systems or visual processing modalities are often confused by waving hands or changing illumination, and systems that track only faces do not run at realistic camera frame rates or do not succeed in real-world environments. Also, visual processing modalities may work well in certain situations but fail dramatically in others, depending on the nature of the scene being processed. Current visual modalities, used singularly, are not consistent enough to detect all heads and discriminating enough to detect heads robustly. Color, for example, changes with shifts in illumination, and people move in different ways. In contrast, "skin color" is not restricted to skin, nor are people the only moving objects in the scene being analyzed.

As such, in the past a variety of techniques have been investigated to unify the results of sets of sensors. One previous technique used variations of a probabilistic data association filter to combine color and edge data for tracking a variety of objects. Another previous technique used priors from color data to bias estimation based on edge data within their framework. Recent techniques have attempted to perform real-time head tracking by combining multiple visual cues. For example, one technique uses edge and color data. Head position estimates are made by comparing match scores based on image gradients and color histograms. The estimate from the more reliable modality is returned. Another technique heuristically integrates color data, range data, and frontal face detection for tracking.

Nevertheless, these systems and techniques are not sufficiently efficient, nor systematically trained, to operate satisfactorily in real world environments. Therefore, what is needed is a technique for fusing the results of multiple vision processing modalities for robustly and efficiently tracking objects of video scenes, such as human head movement and facial movement. What is also needed is a system and method that utilizes Bayesian networks to effectively capture probabilistic dependencies between a true state of the object being tracked and evidence obtained from tracking modalities by incorporating evidence of reliability and integrating different sensing modalities. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for efficiently performing automated vision tracking, such as tracking human head movement and facial movement. The system and method of the present invention fuses results of multiple sensing modalities to achieve robust digital vision tracking.

As a general characterization of the approach, context-sensitive accuracies are inferred for fusing the results of multiple vision processing modalities for performing tracking tasks in order to achieve robust vision tracking. This is accomplished by fusing together reports from several distinct vision processing procedures. Beyond the reports, information with relevance to the accuracy of the reports of each modality is reported by the vision processing modalities.

Specifically, Bayesian modality-accuracy models are built and the reports from multiple vision processing modalities are fused together with appropriate weighting. Evidence about the operating context of the distinct modalities is considered and the accuracy of different modalities is inferred from sets of evidence with relevance to identifying the operating regime in which a modality is operating. In other words, observations of evidence about features in the data being analyzed by the modalities, such as a vision scene, are considered in inferring the reliability of a methods report. The reliabilities are used in the Bayesian integration of multiple reports. The model (a Bayesian network) can be built manually with expertise or trained offline from data collected from a non-vision-based sensor that reports an accurate measure of object position. In addition, the dependencies considered in a model can be restructured with Bayesian learning methods that identify new dependencies.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The present invention is embodied in a system and method for performing automated motion analysis and object tracking, such as human head-tracking, preferably with a Bayesian modality fusion system and method. The Bayesian modality fusion system and method fuses multiple vision tracking methods within a probabilistic framework. Namely, the Bayesian modality fusion system and method models probabilistic dependencies using a Bayesian network and integrates distinct modalities such as motion, color, shape, and edge data. Bayesian models can be developed that adapt their estimates by detecting changes in the expected reliability of different modalities.

Exemplary Operating Environment

Figure 1:
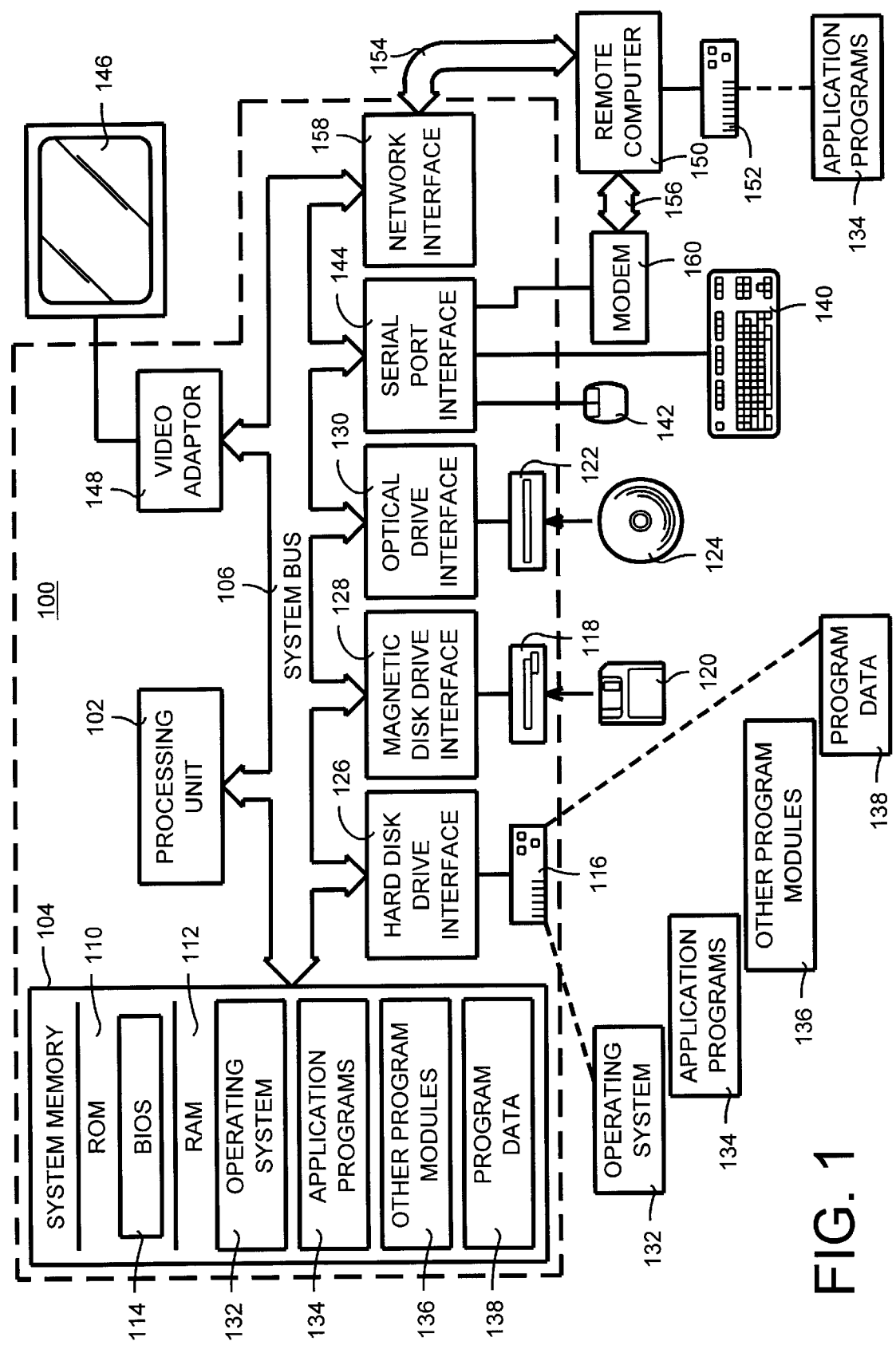
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Figure 2:
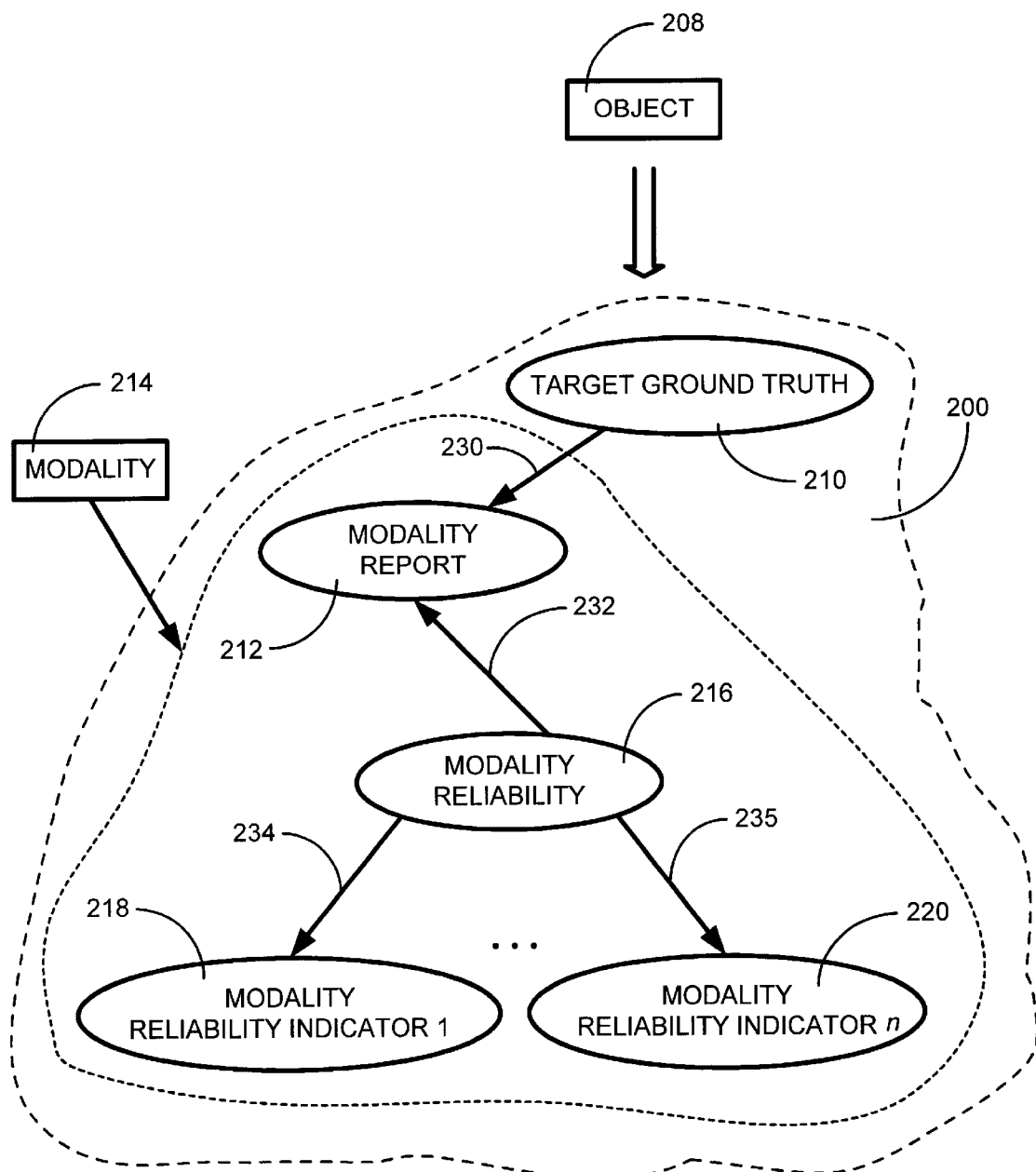
FIG. 2 is a block diagram illustrating a system for inferring data about a visual target conditioned on report information from a single modality in accordance with the present invention.

System Overview:

FIG. 2 is a general block diagram illustrating an overview of the present invention. The system 200 robustly tracks a target object 208 by inferring target data 210, such as the state of the object 208, including position or object coordinate information, orientation, expression, etc., conditioned on report information 212 produced by at least one sensor modality 214 tracking the target 208. The system 200 can be used as a vision-based tracking system for tracking objects of a digitized video scene, such as an input sequence of digital images. The input sequence can be from a live camera or from a sequence of images stored on a recording medium, such as a tape, disk, or any suitable source medium. The target data 210 can be true state information about the target object 208 of the image sequence. Different types of data present in the image sequence, such as color, edge, shape, and motion, can be considered different sensing modalities.

In this case, the system 200 is preferably a Bayesian network for performing Bayesian vision modality fusion for multiple sensing modalities. The Bayesian network captures the probabilistic dependencies between the true state of the object 208 being tracked and evidence obtained from multiple tracking sensing modalities 214. A Bayesian network is a directed acyclic graph that represents a joint probability distribution for a set of random variables. As shown in FIG. 2, the Bayesian network 200 includes nodes 210, 212, 216, 218 and 220 which represent variables of interest or random variables. Arcs or line connectors 230, 232 and 234, 235 represent probabilistic dependencies among pairs of variables. The Bayesian network facilitates making associative and causal assertions about probabilistic influences among the variables.

The present invention constructs, learns, and performs inference with Bayesian models. This includes the use of exact and approximate algorithms for Bayesian-network inference procedures, methods that allow for the learning of conditional probabilities represented in a Bayesian model, the induction of network structure from data, and networks for reasoning over time. In addition, conceptual links between Bayesian networks and probabilistic time-series analysis tools such as hidden Markov models (HMMs) and Kalman filters can be implemented in the present invention. HMMs and Kalman filters can be represented by Bayesian networks with repetitive structure capturing prototypical patterns of independence among classes of variables.

Components and Operation of a Single Modality:

For each sensor modality 214, nodes 212, 218 and 220 are variables that are instantiated by the sensor modality 214 and nodes 210 and 216 represent inferred values. In particular, node 210 is a target ground truth node that represents an unknown state of the target object and the goal of system 200 inference.

From a Bayesian perspective, the ground-truth state influences or causes an output from the sensor modality 214 (it should be noted that the use of term "causes" comprises both deterministic and stochastic components). This influence is indicated with arc 230 from the ground truth node 210 to the modality report node 212. The modality report node 212 is also influenced by its reliability, or its ability to accurately estimate ground-truth state, as indicated with an arc 232 from the modality reliability node 216 to the modality report node 212.

Although reliabilities themselves typically are not directly observed, both reliabilities and estimates of reliabilities vary with the structure of the scene being analyzed. To build a coherent framework for fusing reports from multiple modalities, reliability can be considered as an explicit or implicit variable. From this, probabilistic submodels are built to dynamically diagnose reliability as a function of easily ascertainable static or dynamic features detected by the automated analysis of the image. As shown in FIG. 2, such evidence is represented by n modality reliability indicator nodes 218, 220 which are in turn influenced by the modality reliability node 216, as indicated by the arcs 234, 235.

During operation for a single modality, the Bayesian model is instantiated with the modality report 212 and reliability indicators 218, 220 associated with the sensor modality 214. It should be noted that the order or frequency that the modality contributes its report is flexible. The reliability of the sensor modality 214 is computed and the modality report 212 is used to provide a probability distribution over the ground-truth state 210 of the target object 208. The Bayesian network 200 is equivalent to the following statement of conditional probabilities (for simplicity of illustration, n=1):

$$P(t, m, r, i) = P(t)P(m|t, r)P(r)P(i|r) \qquad (1)$$

With this, it can be shown that, for example, the probability density for the estimate of the ground-truth state depends both upon the report as well as the reliability indicator. If t and i were independent, then:

$$P(t, i|m) = P(t|m)P(i|m).$$

However, $$P(t, i|m) = \frac{\int P(t, m, r, i)dr}{P(m)} = P(t|m)\int P(r|t, m)P(i|r)dr, \quad (2)$$

and $$P(t|m)P(i|m) = P(t|m)\int P(r|m)P(i|r)dr \quad (3)$$

Thus, in general, t and i would be independent only if $P(r|m) = P(r|t, m)$. Similarly, however, this would only be true if $P(m|t, r) = P(m|t)$, which may violate the assumption that the report, m is conditionally dependent on both ground-truth state, t and reliability, r.

Further, given the conditional probabilities that appear on the right hand side of Equation (1), the probability density for ground-truth state can be computed, given a report and reliability indicators:

$$P(t|m, i) = \frac{\int P(t)P(m|t, r)P(r)P(i|r)dr}{\int\int P(t)P(m|t, r)P(r)P(i|r)drdt} \quad (4)$$

Figure 3:
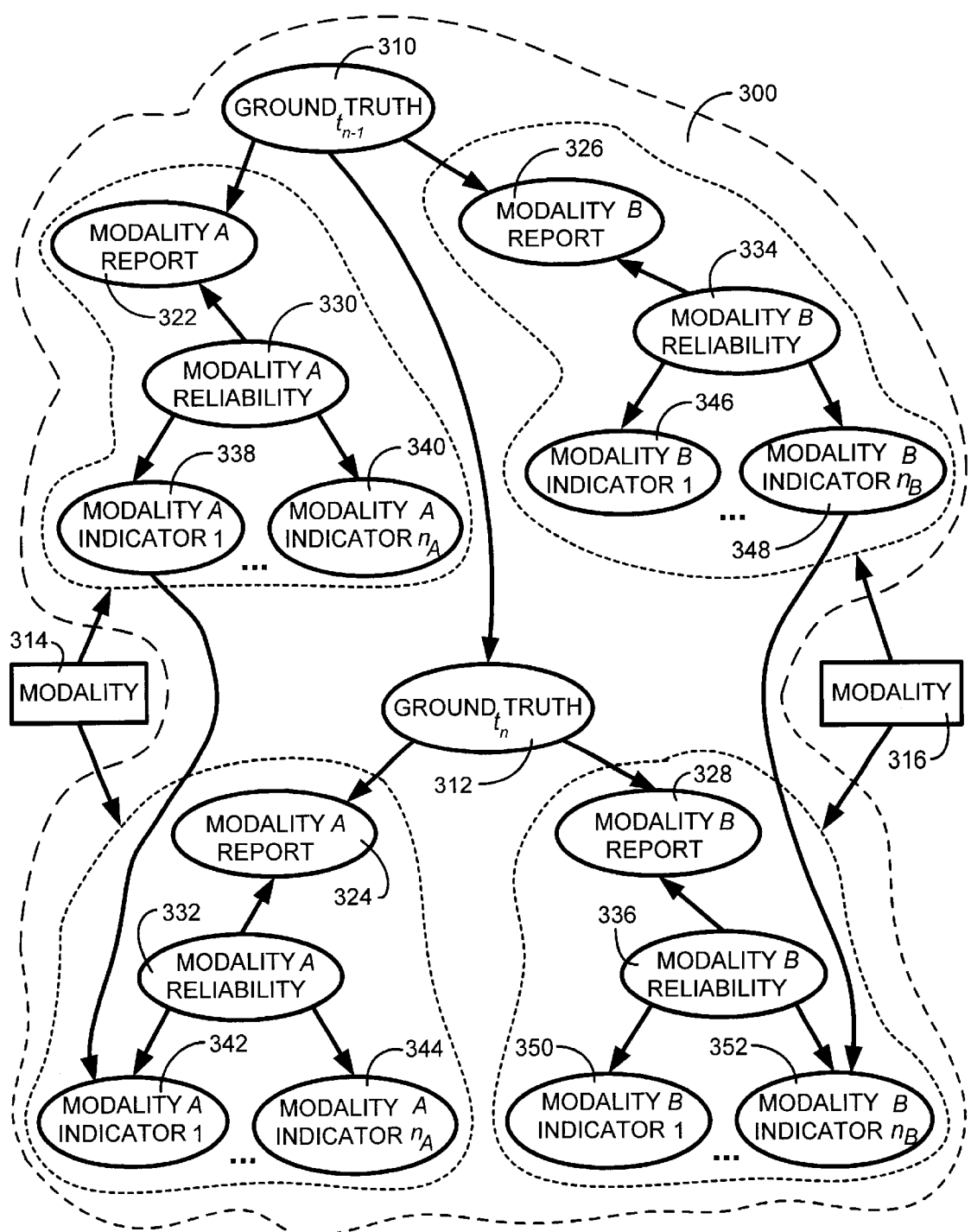
FIG. 3 is a detailed block diagram illustrating a temporal or dynamic Bayesian network, a Bayesian network model that includes an explicit representation of potential probabilistic dependencies among variables at different points in time, for integrating multiple modalities in accordance with the present invention.

Fusion of Multiple Modalities:

In the description above for FIG. 2, a model for inferring the probability distribution over the true state of a target was considered from a report by a single modality. FIG. 3 is a detailed block diagram illustrating a temporal or dynamic network model 300 capturing temporal dependencies among variables at adjacent points in time for integrating multiple modalities for tracking at least one object, such as an object similar to object 208 of FIG. 2, in accordance with the present invention.

The network 300 includes multiple ground truth states 310, 312 each having associated multiple modalities 314, 316, respectively. Each modality 314, 316 produces a modality report represented by nodes 322, 324, 326, 328 respectively, influenced by corresponding modality reliability nodes 330, 332, 334, 336. Evidence represented by respective 1 through n modality reliability indicator nodes 338–340, 342–344, 346–348, 350–352 is in turn caused or influenced by respective modality reliability nodes 330, 332, 334, 336.

The temporal network 300 of FIG. 3 extends the single modality embodiment of FIG. 2 in two ways. First, the network 300 of FIG. 3 includes subsequent ground truth states, $t_n$, and multiple modalities 314, 316, namely sensor modalities A and B for the subsequent ground truth states $t_n$ 312. Each modality 314, 316 produces subsequent modality reports 324, 328 (reports A and B) influenced by respective reliability submodels 332, 336 (submodels A and B) for the subsequent ground truth states $t_n$ 312. It should be noted that although two modalities and respective reports and reliabilities (A and B) are shown in FIG. 3, m different modalities can be included in a similar manner.

The model is further extended to consider temporal dynamics, as well. In the simplest approach, the reliability indicator nodes 338 and 340, 342 and 344, 346 and 348, 350 and 352 can be defined as functions of the dynamics of image features. For example, for image sequences, rapid change in global intensity values over the image could be used as an indicator variable.

In a more explicit approach, the model 300 can be extended so that sets of variables are labeled as states at different times. Representations of Bayesian networks over time that include temporal dependencies among some subset of variables are referred to as dynamic Bayesian networks. In the model of FIG. 3, a previous true state directly influences a current true state and where prior reliability indicators influence current indicators. For example, as shown in FIG. 3, previous ground truth $t_{n-1}$ (node 310) directly influences a current ground truth $t_n$ (node 312) and where prior reliability indicators (nodes 338 and 348) influence current indicators (nodes 342 and 352). By modeling the integration of multiple modalities and considering the changing reliabilities of reports, a flexible filter is gained which weights previous estimates to different degrees based on estimates of their accuracy.

Figure 4:
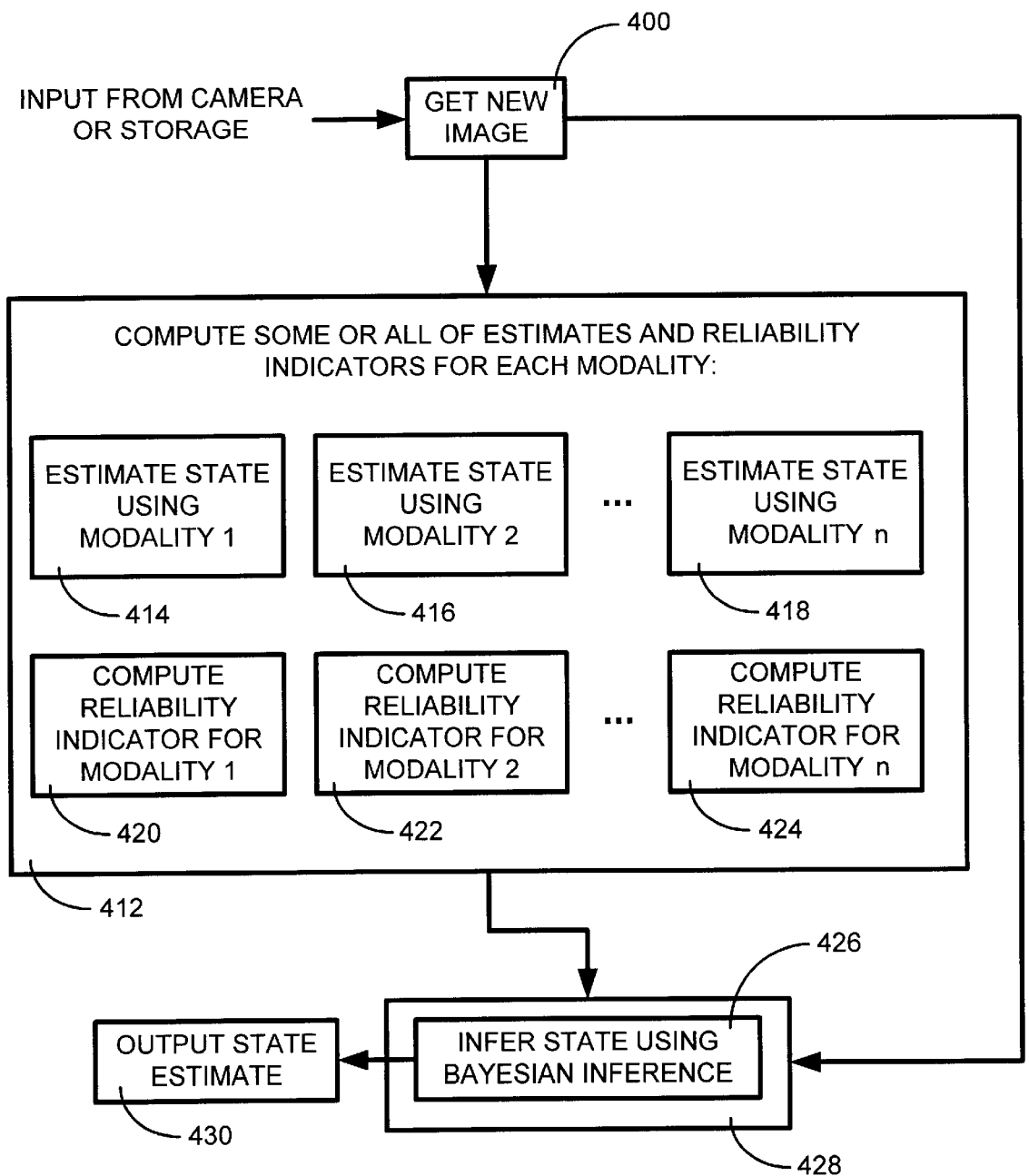
FIG. 4 is a flow diagram illustrating the general operation of the present invention.

Operation:

FIG. 4 is a block/flow diagram illustrating the general operation of the present invention. In general, for video scenes and image applications, new digital image data relating to a target object is first received by the system 400 from, for instance, a live camera or storage (process 410). A modality processor 412 comprised of multiple vision sensing modalities receives the new digital image data. The modality processor 412 computes some or all of estimates and reliability indicators for each modality. Specifically, the modality processor 412 can estimate states using modalities 1, 2 . . . n (processes 414–418) and compute reliability indicators for modalities 1, 2 . . . n (processes 420–424). Next, a sensor fusion analysis processor receives 426 the estimate and reliability indicator computations and infers states using Bayesian inference (process 428). Last, a state estimate is produced that is a synthesized assessment of the computations (process 430).

Referring to FIG. 3 along with FIG. 4, during operation, the models for Bayesian modality fusion are instantiated with reports 322–328 and reliability indicators 338–352, as shown in FIG. 3. The reliability 330–336 of each modality is computed by the processor 412 and the reports 322–328 from the modalities are integrated to provide a probability distribution over the ground-truth state of the target object.

Further, the Bayesian network of the present invention can be trained on real data to assess the probabilities of the effects of indicators on modality reports. Also, reports could be biased based on changing information related to the modalities.

Working Example:

The following description is for illustrative purposes only and describes Bayesian fusion in accordance with the present invention as applied to human head tracking. It should be noted that although the following description involves three modalities, any number of modalities can be used. Also, for simplicity and to illustrate the effectiveness of the Bayesian fusion systems and methods of the present invention, computationally inexpensive modality components are used. In addition, any suitable component can be used, and more sophisticated, complex versions of the sample components can be used.

Figure 5:
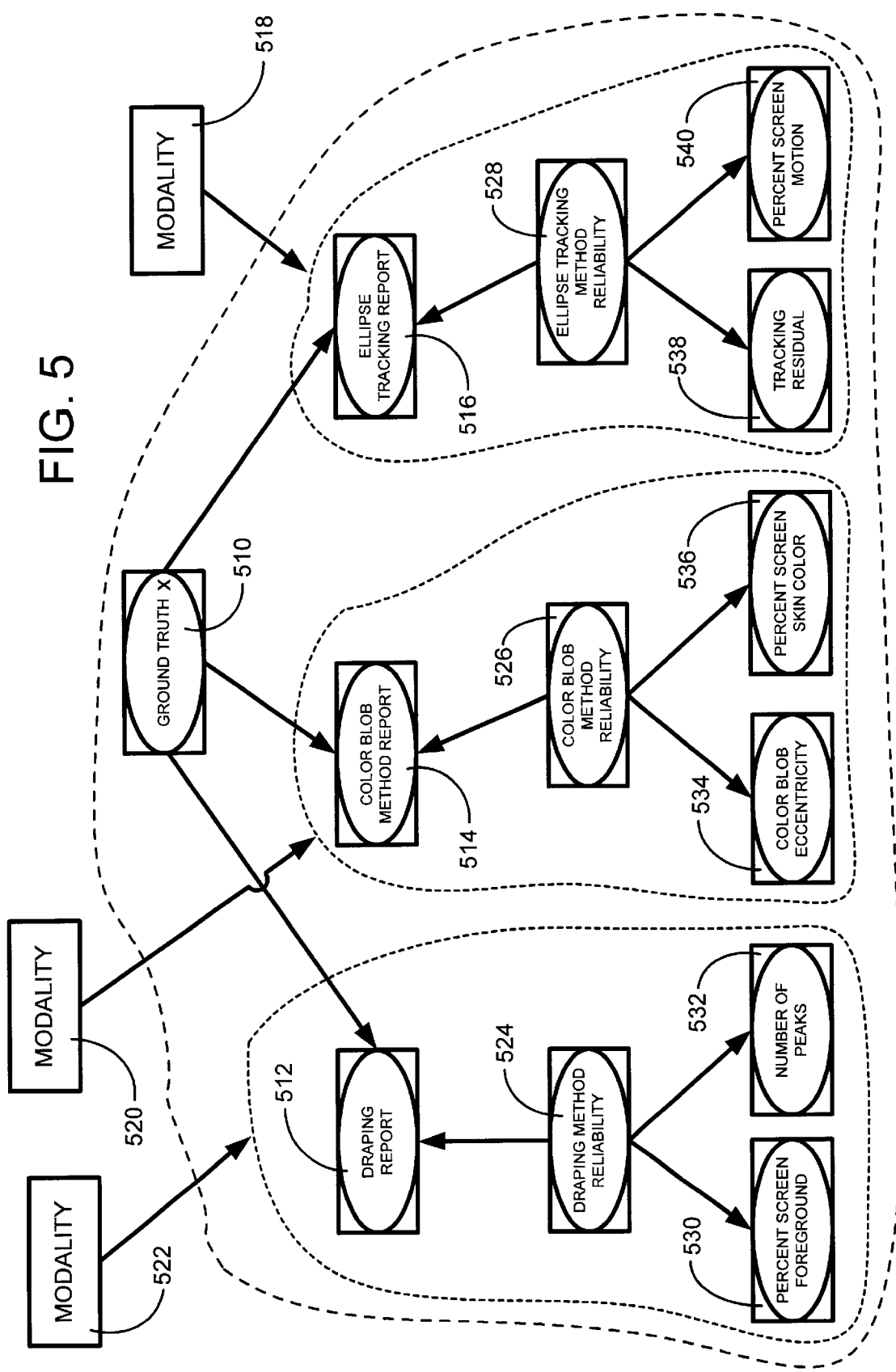
FIG. 5 is a block diagram showing the detailed structure of the Bayesian networks used in a working example of the present invention.

FIG. 5 is a block diagram showing the detailed structure of the Bayesian networks used in a working example of the present invention. FIG. 5 illustrates a Bayesian modality fusion system of the present invention for visual sensing modalities. In this example, a real-time head tracking task is shown with color, motion, and background subtraction modalities fused into a single estimate of head position in an image. Namely, the system 500 robustly tracks a target object, similar to object 208 of FIG. 2, by inferring target data 510 conditioned on report information 512, 514, 516 produced by multiple sensing modalities 518, 520, 522, respectively, tracking the target object.

In general, the network 500 includes one ground truth state 510 and including a consideration of information from multiple modalities 518–522. Each modality 518–522 produces a modality report node 512–516 respectively that represents the reports of the target object or objects location (s), influenced by corresponding modality reliability nodes 524, 526, 528 as well as the variable representing the ground truth. Evidence represented by respective modality reliability indicator nodes 530 and 532, 534 and 536, 538 and 540 are in turn influenced by respective modality reliability nodes 524–528.

The system 500 is preferably a vision-based tracking system for tracking objects of a digitized video scene, such as a sequence of digital images. The target data 510 can be true state information about the target object of the image sequence. Different types of data present in the image sequence, such as edge, color and motion, are used to form a background subtraction visual modality 518, a color-based tracking visual modality 522 and a motion-based tracking visual modality 522.

In particular, the three modalities are (1) peak finding based on background subtraction, (2) color-based "blob" tracking, and (3) motion-based ellipse tracking. The three different visual modalities are implemented with reliability indicators for each modality. Each of these modes reports four values for a surrounding or bounding box of a human head (in image pixels) and two reliability indicators whose output types vary. For all three modalities, computation can take place on low resolution, sub-sampled images (for example, 1 pixel out of every 8×8 from the whole frame).

The Bayesian network 500 captures the probabilistic dependencies between the true state of the object being tracked and evidence obtained from the multiple tracking sensing modalities 518–522. The nodes 510 and 512–540 of the Bayesian network 500 represent variables of interest or random variables and the arcs or line connectors that connect the nodes within system 500 represent probabilistic dependencies among pairs of variables. The Bayesian network 500 facilitates making assertions about and performing inference with the probabilistic influences among the variables.

Both reliabilities and estimates of reliabilities typically vary with the structure of the video scene or image sequence being analyzed. To build a coherent framework for fusing reports from multiple modalities, reliability is considered as a variable. From this, probabilistic submodels are built to dynamically diagnose reliability as a function of easily ascertainable static or dynamic features of the image. As shown in FIG. 5, such evidence is represented by modality reliability indicator nodes 530–540, which are in turn caused or influenced by the actual modality reliability nodes 524–528.

Specifically, for each sensor modality 518, 520, 522, respective nodes 512 and 530–532; 514 and 534–536; and 516 and 538–540 are variables that are instantiated by the modalities 518–522 and respective nodes 524, 526, 528 represent inferred values. Also, node 510 is the target ground truth node that represents an inferred value or an unknown state of the target object and the goal of system 500 inference. The ground-truth state influences or causes an output from the modalities 518–522 with both deterministic and stochastic components. The modality report nodes 512–516 are also influenced by their respective reliabilities, or their abilities to accurately estimate ground-truth state.

During operation, the Bayesian model 500 is instantiated with the modality reports 512–516 of each modality 518–522 and associated reliability indicators 530–540. It should be noted that the order or frequency that the modalities contribute their respective reports is flexible. The reliability of each modality 518–522 is computed and each modality report 512–516 is used to provide a probability distribution over the ground-truth state 510 of the target object, in accordance with the expressions discussed above. Specifics of each modality are discussed in detail below.

Background Subtraction Modality:

Thresholding the difference between a current image and a stored background image immediately identifies foreground pixels if the camera is stationary. To accommodate deviations from this assumption, the stored background is updated in any suitable updating manner, such as the method provided in the reference entitled "Pfinder: Real-time Tracking of the Human Body," by C. R. Wren, A. Asarbayejani, T. Darrell and A. Pentland, and published in Vismod, 1995, which is incorporated herein by reference.

Given a background image, $I_b(*)$, foreground pixels can be determined as follows:

$$I_f(x, t) = \begin{cases} 1, \text{ if } I(x, t) - I_b(x) > k_f^{thresh} \\ 0, \text{ otherwise} \end{cases}$$

A horizontal line of points connected to neighboring points by spring forces is draped onto a resulting image until the points hit significant clusters of foreground pixels, as described in "Visual Interaction with Lifelike Characters" by M. Turk, and published in Automatic Face and Gesture Recognition, 1996, which is herein incorporated by reference. Peaks in the draped line can be identified and the peak with the width and height closest to the previously known dimensions of the head are returned as the output. Indicators for this modality are the number of salient peaks in the draped line and the percentage of the image classified foreground pixels. As a result, the modality report 512 is a draping report, the modality reliability 524 is a draping method reliability and the modality reliability indicators 530, 532 are screen foreground percentages and number of peaks, as shown in FIG. 5.

Color-Based Tracking Modality:

Color is an easily computed cue that aids in head tracking. Various skin colors under likely illuminations can be simply approximated by a truncated pyramidal region in RGB (Red/Green/Blue) space bounded by upper and lower thresholds on ratios between red (r) and green (g) pixels, red (r) and blue (b) pixels, and pixel intensity as follows:

$$k_{int}^- < \frac{r + g + b}{3} < k_{int}^+.$$

Binary skin-color classification is performed over the entire image. Then, clusters of skin-colored pixels are identified by radiating investigative spokes outward from a skin-colored seed pixel until they hit non-skin-colored pixels, as described in U.S. co-pending patent application Ser. No. 09/175,182 entitled "A System And Method For Automatically Detecting Pixel Clusters Within An Image," by Toyama, which is herein incorporated by reference. The bounding box of the cluster whose centroid and size are closest to the previous estimate is reported. Reliability indicators for the color-blob estimate are the aspect ratio of the blob bounding box and the fraction of skin-colored pixels in the image. Thus, the modality report 514 is a color blob report, the modality reliability 526 is a color blob method reliability and the modality reliability indicators 534, 536 are color blob eccentricities and screen skin color percentages, as shown in FIG. 5.

Motion-Based Tracking Modality:

Motion can also be a good indicator of head location, as people rarely hold their heads completely still. Pixels exhibiting motion can be detected by thresholding the difference between temporally adjacent image frames. All motion-detected pixels are preferably to a constant, $k_m$. All other pixels experience a linear decay so that the final decayed motion intensity of the pixel at x is defined as follows:

$$I_m(x, t_i) = \begin{cases} k_m, \text{ if } |I(x, t_i) - I(x, t_{i-1})| < k_m^{thresh}, \\ \max(0, I_m(x, t_{i-1}) - 1), \text{ otherwise.} \end{cases}$$

Ellipse tracking is then performed on the motion intensity image by searching for ellipse parameters (only position and scale over a range immediately surrounding the last known parameters; aspect ratio is fixed) that maximize the normalized sum of the motion intensity values lying beneath the ellipse.

Although motion decay has been used for "stateless" action recognition, the present invention uses it for the purposes of tracking, where it has two desirable effects. First, the decay accumulates motion from previous frames, implicitly smoothing the motion image. Second, the decay creates a gradient in the motion image, rising with recency of motion. Thus, the search range can be constrained for ellipse tracking while maintaining robustness in the absence of motion filters (which often fail under unstable motion). As with color-based head tracking, the bounding box of the final ellipse is used as the head position estimate from motion. Reliability indicators are based on percentage of current motion in the image and the residual of motion intensity observed under the final ellipse. As such, the modality report 516 is an ellipse tracking report, the modality reliability 528 is an ellipse tracking method reliability and the modality reliability indicators 538, 540 are tracking residuals and screen motion percentages, as shown in FIG. 5.

Figure 6:
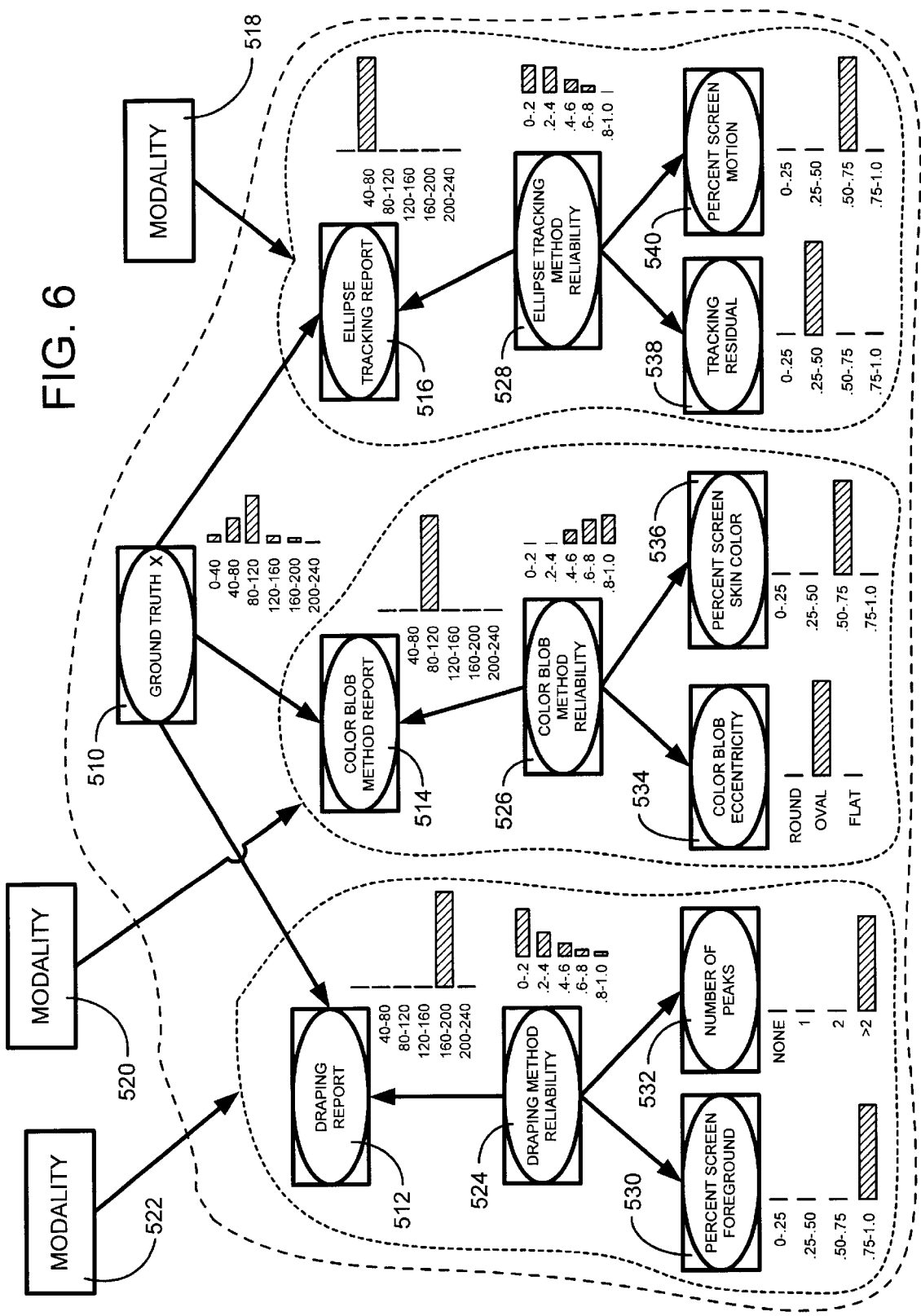
FIGS. 6–7 are block diagrams showing the detailed structure of the Bayesian networks used in the working example of the network of FIG. 5 of the present invention.
Figure 7:
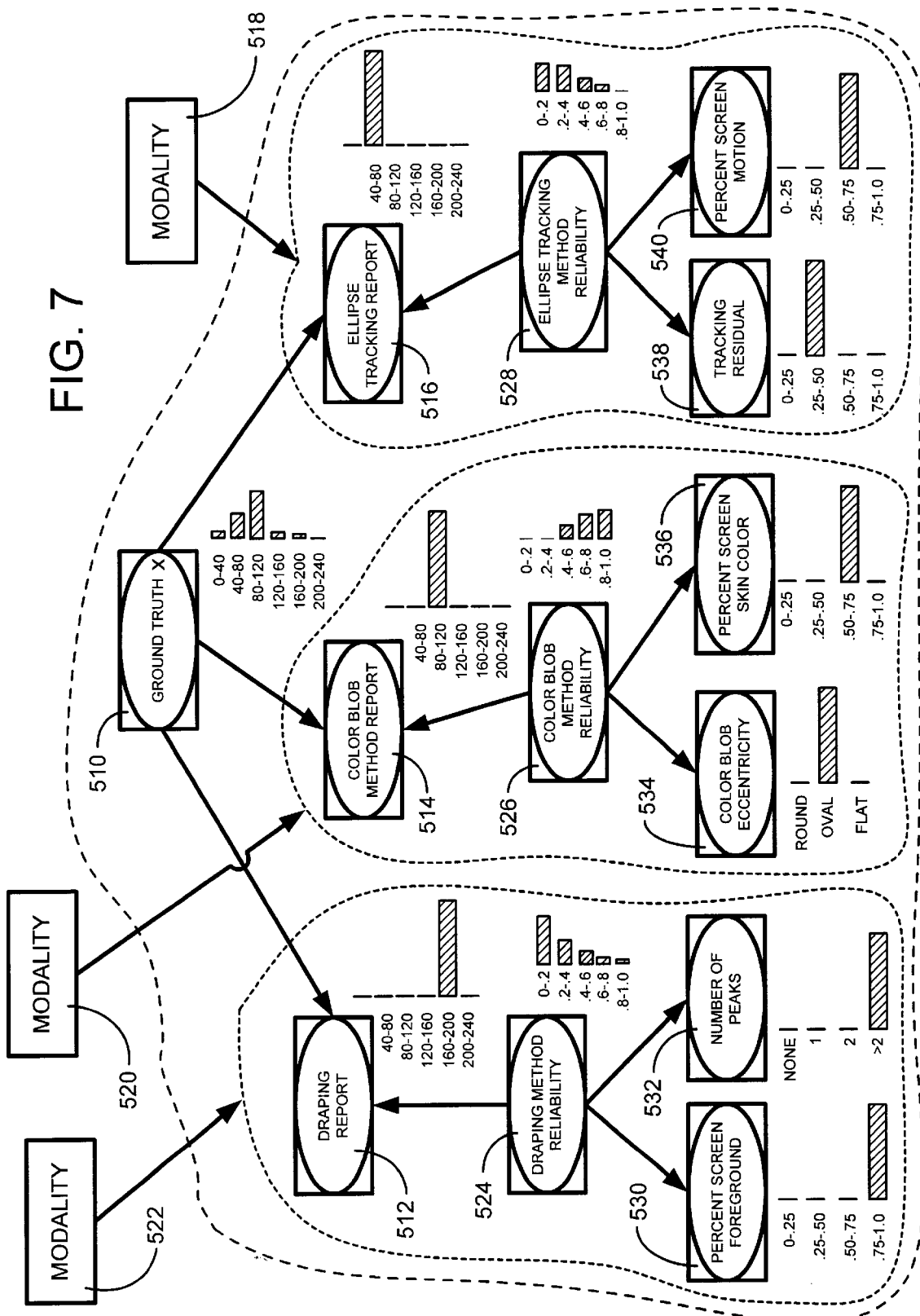

Probability Distributions for the Visual Modalities:

FIGS. 6–7 are block diagrams showing detailed cases of the Bayesian networks used in the working example of the network of FIG. 5 of the present invention. In addition, FIGS. 6–7 illustrate the qualitative performance of the Bayesian modality fusion of the present invention for different cases of the background subtraction, the color-based tracking and the motion-based tracking visual modalities discussed above of FIG. 5.

The network 500 of FIG. 5 includes bar graphs adjacent to each node, as shown in FIGS. 6–7. The bar graph adjacent node 510 (node with inferred value) indicates probability distributions of positional coordinates. The bar graphs adjacent nodes 512–516 (nodes with observed values) indicate observed positional coordinates. The bar graphs adjacent nodes 524–528 (nodes with inferred values) indicate probability distributions as ranges of reliabilities for each associated modality. The bar graphs adjacent nodes 530–540 (nodes with observed values) indicate numerical and descriptive measures of associated modalities.

For purposes of illustration only, all variables that are shown in the graphs are coarsely discretized and some results show horizontal position only. For example, the numerical and descriptive measures of the bar graphs adjacent nodes 512–516 and 530–540 discretize the output of each respective modality and the positional coordinates of the bar graphs adjacent nodes 510 and 512–516 show horizontal position only.

In this example, modality reports and ground truth data are in pixels quantized to bins representing 40 pixels each. Reliabilities can be represented with any suitable range of values. In this case, the range is from 0 to 1, where larger values represent greater reliabilities. For the reliability indicators, reliabilities are suitably measured by the respective type of indicator.

During operation, observational variables (nodes 512–516 and nodes 530–540), are set to specific values by the tracking system and inference is performed to compute probability distributions over the states of the hypothesis variables (node 510 and nodes 524–528), including the ground truth and reliabilities. The two cases of the working example (FIGS. 6–7) highlight the role of context-sensitive changes in reliabilities of methods. Both cases include the identical (though permuted) set of reports from each of the modalities. However, evidence of reliabilities changes, and as a result, the modality on which the final estimate of head position is most heavily based changes as well. Further, the Bayesian network of the present invention can be trained on real data to assess the probabilities of the effects of indicators on modality reports. Also, reports could be biased based on changing information related to the modalities, such as changing levels of illumination or distinct classes of disruptions or instabilities in a scene (illumination based on time of day, sporadic activity, etc.).

Referring to FIG. 6, the report 514 from the color-blob method (color-based tracking modality 520) dominates the final estimate because the network 500 infers that its reliability is high. Namely, as shown in FIG. 6, the bar graph adjacent node 526 shows a probability distribution that is closer to 1.0 than the other nodes 524 and 528 (larger numbers are associated with higher reliabilities for this variable). In addition, the bar graph adjacent node 514 observes positional coordinates of 80–120 which is closer than the other nodes 512 and 516 to the probability distribution coordinates dominated by 80–120 inferred by ground truth node 510.

The reliability itself was computed by its two child reliability indicator nodes 534, 536 whose values are observed directly (and hence concentrated in single bins). As shown in FIG. 6, reliability indicators 538–540 depress motion-based ellipse reliability and reliability indicators 534–536 raise color-based reliability, resulting in a final estimate that reflects the color-based report more strongly.

In the case of FIG. 7, the report 516 from the ellipse tracking method (motion-based tracking modality 522) dominates the final estimate because the network 500 infers that its reliability is high. Although, the bar graph adjacent node 528 shows a probability distribution that is close to 1.0, but not the closest to 1.0 (the bar graph adjacent node 524 is closest to 1.0), the motion-based tracking modality 522 is considered the dominate modality. This is because, as a whole, the motion-based tracking modality 522, as a visual modality, is considered more reliable than the background subtraction modality 518.

This is evidenced by the bar graph adjacent node 516 which observes positional coordinates of 40–80 which is closer than the other nodes 512 and 514 to the probability distribution coordinates dominated by 40–80 inferred by ground truth node 510. Namely, the bar graph adjacent node 512 observes a coordinate far from the probability distribution coordinates dominated by 40–80 inferred by the ground truth node 510. The reliability itself was computed by its two child reliability indicator nodes 538, 540 whose values are observed directly (and hence concentrated in single bins).

The above described Bayesian modality fusion system and method of the present invention robustly and efficiently tracks visual data by integrating multiple visual tracking algorithms in a probabilistic framework. The Bayesian modality fusion of the present invention accomplishes this by adapting its estimates by detecting changes in indicators of reliability of different algorithms. In other words, the Bayesian modality fusion of the present invention provides an expressive framework for weighting and integrating the reports from multiple visual modes. Further, fusion parameters can be learned from data and adjusted automatically, thus eliminating the need to guess the effect of observed variables on inferred variables.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for tracking objects comprising:
   dynamically observing data with a plurality of modalities that sense characteristic results of the objects;
   selectively combining the results of the plural modalities;
   detecting changes in expected reliabilities of the plural modalities influenced by the observations; and
   producing synthesized assessments of a probability distribution over a ground truth represented by an unknown state of the objects and desired inferences.

2. The method of claim 1, wherein the synthesized assessments are indicative of maximum likelihood positions of target objects.

3. The method of claim 1, wherein the plurality of modalities comprises a plurality of visual processing procedures.

4. The method of claim 3, wherein selectively combining the results is based on a consideration of relevant evidence extracted directly from reliability reports of the visual processing procedures.

5. The method of claim 4, further comprising using the relevant evidence to fuse together reliability reports of the visual processing procedures for producing synthesized assessments of the ground truth.

6. The method of claim 3, wherein selectively combining the results is based on a consideration of relevant evidence extracted from an operating context of the visual processing procedures on reliability reports of the visual processing procedures.

7. The method of claim 6, further comprising using the relevant evidence to fuse together reliability reports of the visual processing procedures and producing synthesized assessments of the ground truth.

8. The method of claim 1, further comprising training on known data to assess probabilities of effects of indicators on modality results.

9. The method of claim 1, wherein the results are biased based on changing information related to the modalities.

10. The method of claim 1, further comprising creating dependencies between actual characteristics of the object and the results obtained from the plural modalities and restructuring the dependencies with Bayesian models that identify new sets of dependencies.

11. The method of claim 3, further comprising training with data collected from a non-visual sensor that reports accurate characteristics of the object in order to enhance the assessments.

12. The method of claim 1, further comprising identifying conditional probabilities with a learning module.

13. The method of claim 1, further comprising using a Bayesian learning module to infer probabilistic dependency structure among variables and conditional probabilities characterizing the dependencies.

14. The method of claim 1, further comprising using a Bayesian learning model to infer hidden variables, dependencies, and conditional probabilities.

15. The method of claim 1, wherein the synthesized assessments are indicative of at least one of location and motion of the objects for tracking the objects.

16. A tracking device for tracking objects comprising:
    a processor receiving original data associated with the objects and processing the data with a plurality of modalities to produce plural estimates and reliability indicators; and
    a sensor fusion processor receiving the estimates and reliability indicators to selectively combine the estimates and produce synthesized assessments of the data influenced by the reliability indicators.

17. The tracking device of claim 16, wherein the plurality of modalities are a plurality of visual processing procedures.

18. The tracking device of claim 17, wherein the sensor fusion processor receives and uses relevant evidence extracted directly from reliability reports of the visual processing procedures to produce the synthesized assessments.

19. The tracking device of claim 18, wherein the sensor fusion processor uses the relevant evidence to fuse together reliability reports of the visual processing procedures to produce the synthesized assessments of a ground truth represented by an unknown state of the objects and desired inferences.

20. The tracking device of claim 17, further comprising a combine module capable of combining the estimates produced by the plural modalities based on relevant evidence extracted from an operating context of the visual processing procedures.

21. The tracking device of claim 16, further comprising a training module capable of being trained on known data to assess probabilities of effects of indicators on modality results.

22. The tracking device of claim 16, wherein the estimates are biased based on changing information related to the modalities.

23. The tracking device of claim 16, further comprising dependencies created between actual characteristics of the object and the results obtained from the plural modalities, wherein the sensor fusion processor is capable of restructuring the dependencies with Bayesian models that identify new sets of dependencies.

24. The tracking device of claim 23, wherein the sensor fusion processor is capable of training the model from data collected from a non-visual sensor that reports an accurate measure of object position.

25. The tracking device of claim 16, further comprising a Bayesian learning module capable of inferring probabilistic dependency structure among variables and conditional probabilities characterizing the dependencies.

26. The tracking device of claim 16, further comprising a Bayesian learning model capable of inferring at least one of hidden variables, dependencies and conditional probabilities.

27. The tracking device of claim 16, wherein the synthesized assessments are indicative of at least one of location and motion of the objects for tracking the objects.

28. A computer-readable medium having computer-executable components for tracking objects, comprising:
    a modality component capable of processing original data associated with the objects with a plurality of modalities to produce plural estimates and reliability indicators; and a sensor fusion component capable of selectively combining the estimates and using the reliability indicators to produce synthesized assessments of the data influenced by the reliability indicators.

29. The computer-readable medium of claim 28, wherein the plurality of modalities is a plurality of visual processing procedures.

30. The computer-readable medium of claim 29, wherein the sensor fusion component receives and uses relevant evidence extracted directly from reliability reports of the visual processing procedures to produce the synthesized assessments.

31. The computer-readable medium of claim 30, wherein the sensor fusion component uses the relevant evidence to fuse together reliability reports of the visual processing procedures to produce the synthesized assessments of a ground truth represented by an unknown state of the objects and desired inferences.

32. The computer-readable medium of claim 29, further comprising a component capable of combining the estimates produced by the plural modalities based on relevant evidence extracted from an operating context of the visual processing procedures.

33. The computer-readable medium of claim 28, further comprising a training component capable of being trained on known data to assess probabilities of effects of indicators on modality results.

34. The computer-readable medium of claim 28, wherein the estimates are biased based on changing information related to the modalities.

35. The computer-readable medium of claim 28, further comprising dependencies created between actual characteristics of the object and the results obtained from the plural modalities, wherein the sensor fusion component is capable of restructuring dependencies with Bayesian models that identify new sets of dependencies.

36. The computer-readable medium of claim 35, wherein the sensor fusion component is capable of training the model from data collected from a non-visual sensor that reports an accurate measure of object position.

37. The computer-readable medium of claim 28, further comprising a Bayesian learning module capable of inferring probabilistic dependency structure among variables and conditional probabilities characterizing the dependencies.

38. The computer-readable medium of claim 28, further comprising a Bayesian learning component model capable of inferring at least one of hidden variables, dependencies, and conditional probabilities.

39. The computer readable medium of claim 28, wherein the synthesized assessments are indicative of location of the objects tracked.

40. The computer readable medium of claim 28, wherein the synthesized assessments are indicative of motion of the objects tracked.

* * * * *

UNITED STATES PATENT AND TRADEMARK OFFICE
CERTIFICATE OF CORRECTION

PATENT NO. : 6,499,025 B1
DATED : December 24, 2002
INVENTOR(S) : Eric J. Horvitz and Kentaro Toyama It is certified that error appears in the above-identified patent and that said Letters Patent is hereby corrected as shown below:

Column 10,
Line 48, insert missing equations as follows:
--

$$k^-_{rg} \prec \frac{r}{g} \prec k^+_{rg},$$

$$k^-_{rb} \prec \frac{r}{b} \prec k^+_{rb},$$

--

Signed and Sealed this

Ninth Day of September, 2003

JAMES E. ROGAN
*Director of the United States Patent and Trademark Office*